US012620366B2

(12) United States Patent
Choe et al.

(10) Patent No.: US 12,620,366 B2
(45) Date of Patent: May 5, 2026

(54) DISPLAY DEVICE WITH GRAY VOLTAGE FOR CONTROLLING A LUMINANCE DEVIATION

(71) Applicant: LG Display Co., Ltd., Seoul (KR)

(72) Inventors: Kahyung Choe, Paju-si (KR); YoungHo Kim Kim, Paju-si (KR); MiSo Kim, Paju-si (KR); NanYi Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/936,095

(22) Filed: Nov. 4, 2024

(65) Prior Publication Data

US 2025/0157415 A1 May 15, 2025

(30) Foreign Application Priority Data

Nov. 9, 2023 (KR) ........................ 10-2023-0154318

(51) Int. Cl.
*G09G 3/3275* (2016.01)

(52) U.S. Cl.
CPC ..... *G09G 3/3275* (2013.01); *G09G 2310/027* (2013.01); *G09G 2310/0297* (2013.01); *G09G 2310/061* (2013.01); *G09G 2320/0233* (2013.01); *G09G 2320/0247* (2013.01); *G09G 2320/0626* (2013.01); *G09G 2320/0693* (2013.01); *G09G 2340/0435* (2013.01)

(58) Field of Classification Search
CPC ........... G09G 3/3275; G09G 2310/027; G09G 2310/0297; G09G 2310/061; G09G 2320/0233; G09G 2320/0247; G09G 2320/0626; G09G 2320/0693; G09G 2340/0435
See application file for complete search history.

(56) References Cited

U.S. PATENT DOCUMENTS

| | | | | |
|---|---|---|---|---|
| 9,734,800 | B2 * | 8/2017 | Han | G09G 5/18 |
| 9,886,908 | B2 * | 2/2018 | Tani | G09G 3/3275 |
| 10,504,405 | B2 * | 12/2019 | Bae | G09G 3/2074 |
| 10,818,237 | B2 * | 10/2020 | Noh | G09G 3/3275 |
| 11,004,403 | B2 * | 5/2021 | Park | G09G 3/3233 |
| 11,056,055 | B2 * | 7/2021 | Chung | G09G 3/3266 |
| 11,107,404 | B2 * | 8/2021 | Park | G09G 3/3275 |
| 11,107,414 | B2 * | 8/2021 | Feng | G09G 3/3275 |
| 11,127,359 | B2 * | 9/2021 | Yuan | G09G 3/3291 |
| 11,227,550 | B2 * | 1/2022 | Feng | G09G 3/3266 |
| 11,250,747 | B2 * | 2/2022 | Park | G09G 3/3266 |

(Continued)

*Primary Examiner* — Gene W Lee
(74) *Attorney, Agent, or Firm* — Seed Intellectual Property Law Group LLP

(57) ABSTRACT

Embodiments of the disclosure relate to a display device and a display driving method. A display device according to the disclosure may comprise a display panel where a plurality of subpixels are disposed, a gate driving circuit applying a gate signal to the display panel, a data driving circuit converting image data into a data voltage and applying the data voltage to the display panel, and a timing controller controlling a sensing process for detecting a sensing voltage for a subpixel characteristic value in a blank period and a data update process for updating the image data according to the sensing voltage. The data driving circuit may apply a gray voltage for controlling a luminance deviation in the data update process to the display panel.

17 Claims, 14 Drawing Sheets

(56) References Cited

U.S. PATENT DOCUMENTS

| | | | | |
|---|---|---|---|---|
| 11,527,210 | B2 * | 12/2022 | Jang | G09G 3/3291 |
| 11,568,820 | B2 * | 1/2023 | Feng | G11C 19/287 |
| 12,118,906 | B2 * | 10/2024 | Wei | G09G 3/006 |
| 12,400,600 | B2 * | 8/2025 | Kim | G09G 3/3233 |
| 2020/0051499 | A1 * | 2/2020 | Chung | G09G 5/377 |
| 2020/0160781 | A1 * | 5/2020 | Park | G09G 3/3275 |
| 2022/0199025 | A1 * | 6/2022 | Hong | G09G 3/3258 |
| 2023/0066738 | A1 * | 3/2023 | Park | G09G 3/3275 |
| 2023/0197000 | A1 * | 6/2023 | Jo | G09G 3/3233 345/690 |

* cited by examiner

142: oscillator
143: spread clock generator
144: multiplexer
145: internal data enable signal generator
146: switch control signal generator
147: output buffer

DISPLAY DEVICE WITH GRAY VOLTAGE FOR CONTROLLING A LUMINANCE DEVIATION

CROSS-REFERENCE TO RELATED APPLICATION

This application claims priority from Korean Patent Application No. 10-2023-0154318, filed on Nov. 9, 2023, which is hereby incorporated by reference for all purposes as if fully set forth herein.

BACKGROUND

Technical Field

Embodiments of the disclosure relate to a display device and a display driving method, and more particularly, to a display device and a display driving method capable of mitigating luminance deviation that occurs while updating a sensing voltage for a characteristic value of a subpixel.

Description of the Related Art

With the development of the information society, various needs for display devices that display images are increasing, and various types of display devices, such as liquid crystal displays LCDs, organic light emitting diode displays OLEDs, etc., are being utilized.

Among these display devices, the organic light emitting display device uses self-emissive organic light emitting diodes, providing advantages, such as a fast response and better contrast ratio, luminous efficiency, luminance, and viewing angle.

The display device may include light emitting elements respectively arranged in a plurality of subpixels disposed on a display panel and cause the light emitting diodes to emit light by controlling the voltage applied to the light emitting elements, thereby displaying images while controlling the brightness of each subpixel.

In this case, in each subpixel defined on the display panel, a light emitting element and a driving transistor for allowing the light emitting element to emit light are disposed, and a deviation may occur in the characteristic value of the subpixel and mobility or threshold voltage of the driving transistor depending on the driving environment of the display panel. A deviation in luminance between subpixels (luminance non-uniformity) may result, degrading image quality.

To reduce the luminance deviation, a characteristic value sensing process is performed which senses the characteristic value of the subpixel in the blank period and compensates for the same. However, a flicker may be perceived due to a gray voltage missing in the process of sensing and updating the characteristic value of the subpixel.

BRIEF SUMMARY

The inventors of the disclosure have invented a display device and display driving method capable of mitigating a luminance deviation that occurs while updating the data voltage by reflecting a variation in the characteristic value of the subpixel.

Embodiments of the disclosure may provide a display device and a display driving method capable of mitigating a luminance deviation that occurs while updating the data voltage by independently controlling a gray voltage in a data update period of updating the data voltage by reflecting a variation in the characteristic value of the subpixel.

Further, embodiments of the disclosure may provide a display device and a display driving method capable of reducing an increase in luminance that occurs due to an increase in the blank period in low-frequency driving by applying a gray voltage in a blank period.

Further, embodiments of the disclosure may provide a display device and a display driving method capable of mitigating a luminance deviation that occurs while updating a data voltage by independently controlling a gray voltage in a variable refresh rate mode in which the driving frequency is varied.

Embodiments of the disclosure may provide a display device comprising a display panel where a plurality of subpixels are disposed, a gate driving circuit applying a gate signal to the display panel, a data driving circuit converting image data into a data voltage and applying the data voltage to the display panel, and a timing controller controlling a sensing process for detecting a sensing voltage for a subpixel characteristic value in a blank period and a data update process for updating the image data according to the sensing voltage, wherein the data driving circuit applies a gray voltage for controlling a luminance deviation in the data update process to the display panel.

Embodiments of the disclosure may provide a method for driving a display device including a display panel where a plurality of subpixels are disposed, a gate driving circuit applying a gate signal to the display panel, and a data driving circuit converting image data into a data voltage and applying the data voltage to the display panel, comprising, in a blank period, a sensing process for detecting a sensing voltage for a subpixel characteristic value for one or more selected gate lines and a data update process for updating the image data according to a sensing voltage detected in the sensing process, wherein a gray voltage for controlling a luminance deviation is applied in the data update process.

According to embodiments of the disclosure, it is possible to mitigate a luminance deviation that occurs while updating the data voltage by reflecting a variation in the characteristic value of the subpixel.

According to embodiments of the disclosure, it is possible to mitigate a luminance deviation that occurs while updating the data voltage by independently controlling a gray voltage in a data update period of updating the data voltage by reflecting a variation in the characteristic value of the subpixel.

According to embodiments of the disclosure, it is possible to mitigate a luminance deviation that occurs while updating a data voltage by independently controlling a gray voltage in a variable refresh rate mode in which the driving frequency is varied.

According to embodiments of the disclosure, it is possible to reduce an increase in luminance that occurs due to an increase in the blank period in low-frequency driving by applying a gray voltage in a blank period.

According to embodiments of the disclosure, it is possible to reduce power consumption for mitigating a luminance deviation and implement low power consumption by simplifying a process for compensating for the luminance deviation while preventing degradation of image quality due to the luminance deviation.

BRIEF DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
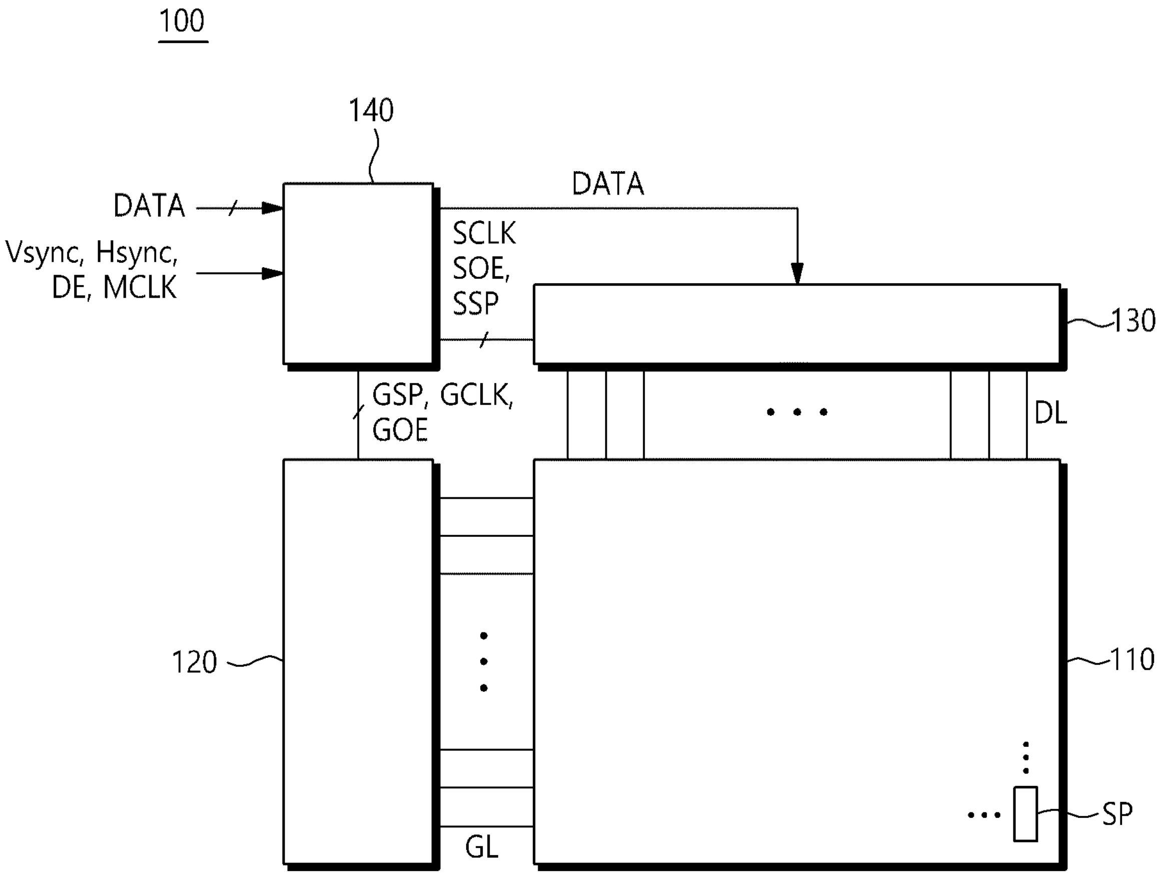
FIG. 1 is a view schematically illustrating a display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a display device according to embodiments of the disclosure;

Referring to FIG. 1, a display device 100 according to embodiments of the disclosure may include a display panel 110 where a plurality of gate lines GL and data lines DL are connected, and a plurality of subpixels SP are arranged in a matrix form, a gate driving circuit 120 providing signals to the plurality of gate lines GL, a data driving circuit 130 supplying a data voltage through the plurality of data lines DL, and a timing controller 140 controlling the gate driving circuit 120 and the data driving circuit 130.

The display panel 110 displays an image based on a gate signal transferred from the gate driving circuit 120 through the plurality of gate line GLs GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be defined by the plurality of data lines DL and the plurality of gate lines GL.

One subpixel SP may include, e.g., a thin film transistor (TFT) disposed in an area formed by one data line DL and one gate line GL, a light emitting element, such as a light emitting diode, that emits light according to a data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL may be connected to 2,160 gate lines GL and four subpixels WRGB, and thus, there may be provided 3,840×4=15,360 data lines DL. Each subpixel SP is disposed in the area formed by the gate line GL and the data line DL.

The gate driving circuit 120 may be controlled by the timing controller 140 to sequentially output gate signals to the plurality of gate lines GL disposed in the display panel 110, controlling the driving timing of the plurality of subpixels SP.

In the display device 100 having a resolution of 2,160×3,840, sequentially outputting the gate signal to the 2,160 gate lines GL from the first gate line to the 2,160th gate line may be referred to as 2,160-phase driving. Or, when gate signals are sequentially output on a per-four gate line GL basis, like when gate signals are sequentially output from the first gate line to the fourth gate line and then gate signals are sequentially output from the fifth gate line to the eight gate line, is referred to as four-phase driving. In other words, when gate signals are sequentially output every N gate lines GL may be referred to as N-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) type in which it is directly formed in the bezel area of the display panel 110.

The data driving circuit 130 receives digital image data DATA from the timing controller 140 and converts the received digital image data DATA into an analog data voltage. Then, as the data voltage is output to each data line DL according to the timing when the gate signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a gate signal according to the timing implemented in each frame and, on the other hand, transfers the digital image data DATA received from the outside to the data driving circuit 130.

In this case, the timing controller 140 receives, from the outside (e.g., a host system), several timing signals including, e.g., a vertical synchronization signal Vsync, a horizontal synchronization signal Hsync, a data enable signal DE, and a main clock MCLK, together with the digital image data DATA. Accordingly, the timing controller 140 may generate a control signal according to various timing signals received from the outside and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the gate signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 may further include a power management integrated circuit that supplies various voltages or currents to, e.g., the display panel 110, the gate driving circuit 120, and the data driving circuit 130 or controls various voltages or currents to be supplied.

Meanwhile, a light emitting element may be disposed in each subpixel SP. For example, the organic light emitting diode display may include a light emitting element, such as a light emitting diode, in each subpixel SP and may display an image by controlling the current flowing to the light emitting element according to the data voltage.

Figure 2:
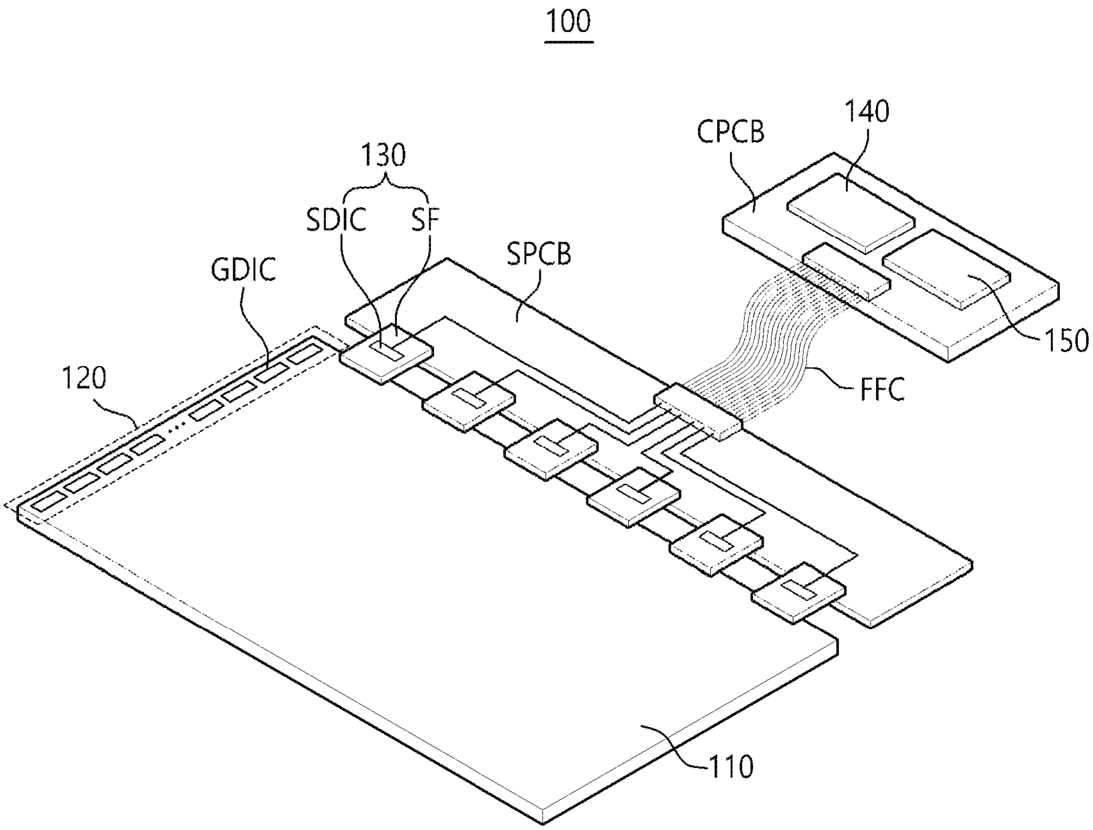
FIG. 2 is a view illustrating an example of a system of a display device according to embodiments of the disclosure.

FIG. 2 is a view illustrating an example of a system of a display device according to embodiments of the disclosure;

Referring to FIG. 2, a display device 100 according to embodiments of the disclosure may include a gate driving circuit 120 applying a gate signal to a display panel 110, a data driving circuit 130 supplying a data voltage to the display panel 110, a timing controller 140 controlling the gate driving circuit 120 and the data driving circuit 130, and a power management circuit 150 supplying a driving voltage.

It is herein illustrated that the source driving integrated circuit SDIC constituting the data driving circuit 130 is implemented in a chip-on-film (COF) type among various types (e.g., TAB, COG, or COF), and the gate driving integrated circuit GDIC constituting the gate driving circuit 120 is implemented in a gate-in-panel (GIP) type among various types (e.g., TAB, COG, COF, or GIP).

When the gate driving circuit 120 is implemented in the GIP type, the plurality of gate driving integrated circuits GDIC included in the gate driving circuit 120 may be directly formed in the bezel area of the display panel 110. In this case, the gate driving integrated circuits GDIC may receive various signals (e.g., a clock signal, a gate high signal, a gate low signal, etc.) necessary for generating gate signals through gate driving-related signal lines disposed in the bezel area.

Likewise, one or more source driving integrated circuits SDIC included in the data driving circuit 130 each may be mounted on the source film SF, and one side of the source film SF may be electrically connected with the display panel 110. Lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. The at least one source printed circuit board SPCB and control printed circuit board CPCB may be integrated into a single printed circuit board.

The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include a light emitting element and a circuit element, e.g., a driving transistor, for driving the organic light emitting diode.

The type and number of circuit elements constituting each subpixel SP may be varied depending on functions to be provided and design schemes.

Figure 3:
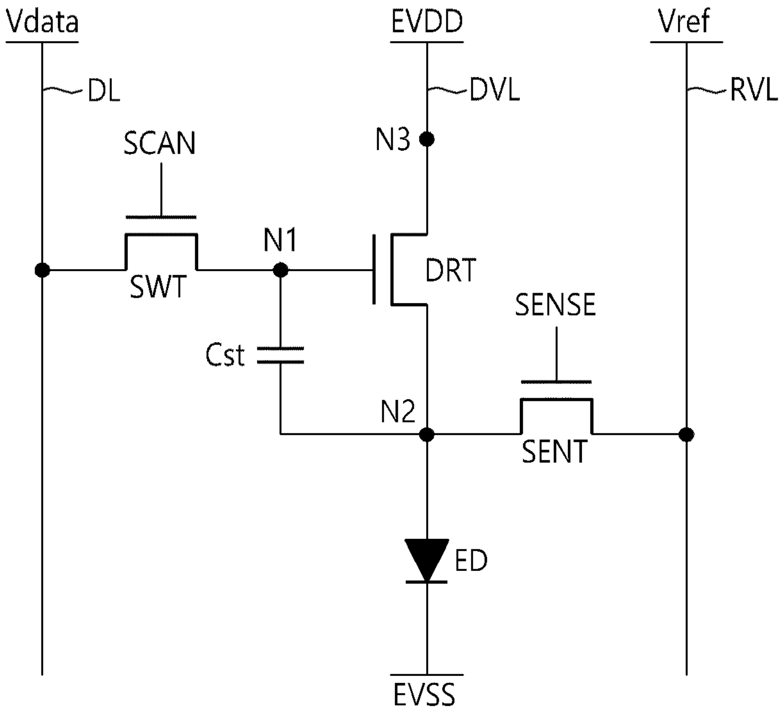
FIG. 3 is a view illustrating an example of a circuit constituting a subpixel in a display device according to embodiments of the disclosure.

FIG. 3 is a view illustrating an example of a circuit constituting a subpixel in a display device according to embodiments of the disclosure.

Referring to FIG. 3, in the display device 100 according to embodiments of the disclosure, the subpixel SP may include one or more transistors and a capacitor and an organic light emitting diode (OLED) as a light emitting element ED.

For example, the subpixel SP may include a driving transistor DRT, a switching transistor SWT, a sensing transistor SENT, a storage capacitor Cst, and a light emitting element ED.

The driving transistor DRT includes the first node N1, second node N2, and third node N3. The first node N1 of the driving transistor DRT may be a gate node to which the data voltage Vdata is applied from the data driving circuit 130 through the data line DL when the switching transistor SWT is turned on. The second node N2 of the driving transistor DRT may be electrically connected with the anode electrode of the light emitting element ED and may be the source node or drain node. The third node N3 of the driving transistor DRT may be electrically connected with the driving voltage line DVL to which the driving voltage EVDD is applied and may be the drain node or the source node.

In this case, during a display driving period, a driving voltage EVDD necessary for displaying an image may be supplied to the driving voltage line DVL. For example, the driving voltage EVDD necessary for displaying an image may be 27V.

The switching transistor SWT is electrically connected between the first node N1 of the driving transistor DRT and the data line DL, and the gate line GL is connected to the gate node. Thus, the switching transistor SWT is operated according to the scan signal SCAN supplied through the gate line GL. The scan signal SCAN is a type of gate signal supplied to the switching transistor SWT through the gate line GL.

When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the sense signal SENSE supplied through the gate line GL. The sense signal SENSE is a type of gate signal supplied to the sensing transistor SENT through the gate line GL. When the sensing transistor SENT is turned on, a sensing reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting element ED may be supplied.

The gate nodes of the switching transistor SWT and the sensing transistor SENT may be commonly connected to one gate line GL or may be connected to different gate lines GL. An example is shown in which the switching transistor SWT and the sensing transistor SENT are connected to different gate lines GL in which case the switching transistor SWT and the sensing transistor SENT may be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT may be simultaneously controlled by the scan signal SCAN or sense signal SENSE transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting element ED may be electrically connected with the second node N2 of the driving transistor DRT, and a base voltage EVSS may be applied to the cathode electrode of the light emitting element ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The structure of the subpixel SP described above as an example is a 3T (transistor) 1C (capacitor) structure, which is merely an example for description, and may further include one or more transistors or, in some cases, one or more capacitors. The plurality of subpixels SP may have the same structure, or some of the plurality of subpixels SP may have a different structure.

To effectively sense a characteristic value, e.g., threshold voltage or mobility, of the driving transistor DRT, the display device 100 according to embodiments of the disclosure may use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel SP. Thus, the reference voltage line RVL may also be referred to as a sensing line.

Figure 4:
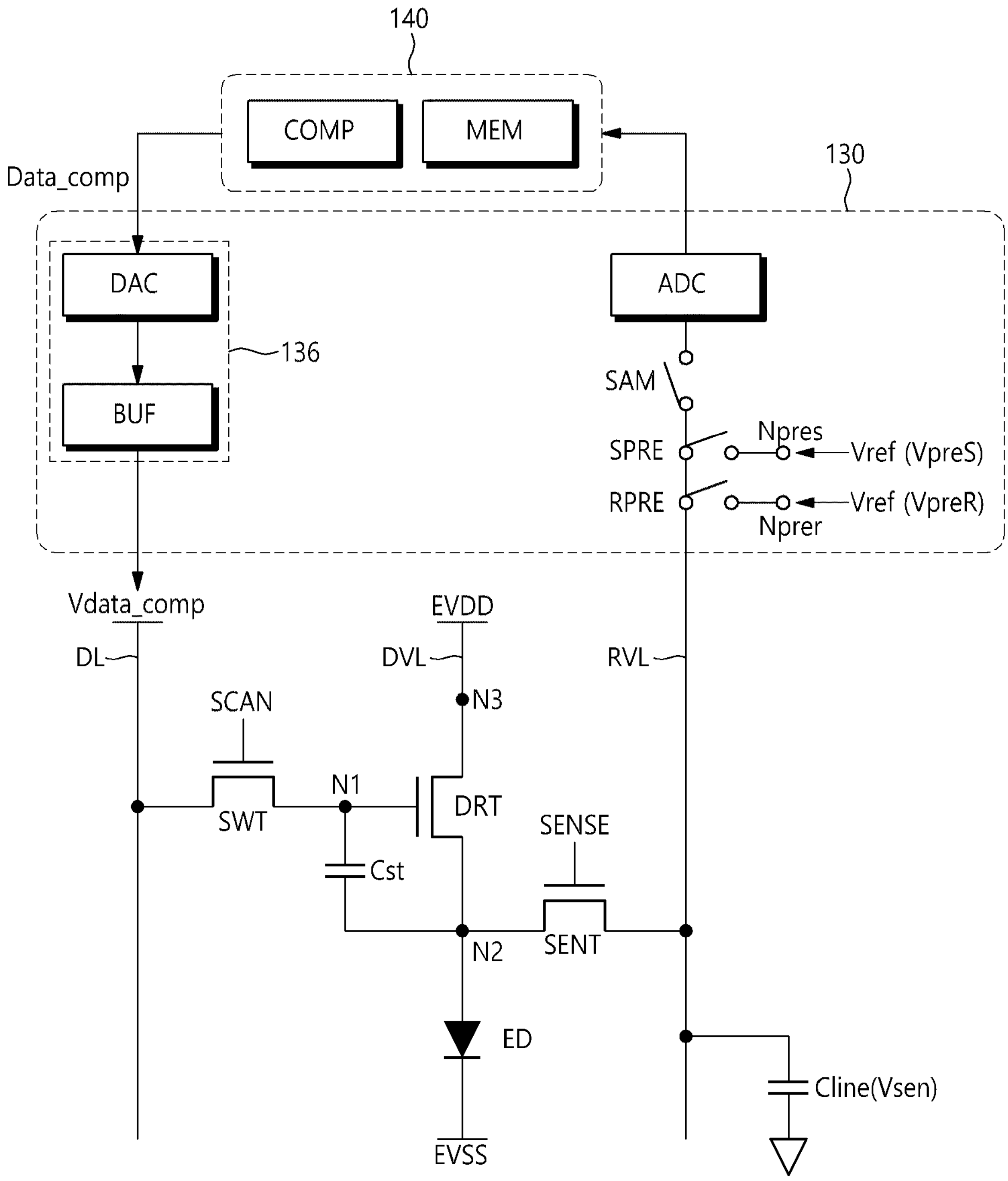
FIG. 4 is a view illustrating an example circuit structure of sensing a characteristic value of a driving transistor in a display device according to embodiments of the disclosure.

FIG. 4 is a view illustrating an example circuit structure of sensing a characteristic value of a driving transistor in a display device according to embodiments of the disclosure.

Referring to FIG. 4, a display device 100 according to embodiments of the disclosure may include components for compensating for a deviation in the characteristic value of the driving transistor DRT.

For example, the characteristic value, or a change therein, of the driving transistor DRT may be reflected as the voltage (e.g., Vdata-Vth) of the second node N2 of the driving transistor DRT. The voltage of the second node N2 of the driving transistor DRT may correspond to the voltage of the reference voltage line RVL when the sensing transistor SENT is in the turned-on state. Further, the line capacitor Cline of the reference voltage line RVL may be charged by the voltage of the second node N2 of the driving transistor DRT, and the reference voltage line RVL may have a voltage corresponding to the voltage of the second node N2 of the driving transistor DRT based on the sensing voltage Vsen charged to the line capacitor Cline.

The display device 100 may include an analog-to-digital converter ADC for measuring the voltage of the reference voltage line RVL corresponding to the voltage of the second node N2 of the driving transistor DRT and converting the voltage into a digital value, and a switch circuit SAM, SPRE for sensing characteristic values.

The switch circuit SAM, SPRE for controlling the characteristic value sensing driving may include a sensing reference switch SPRE for controlling a connection between the reference voltage line RVL and the sensing reference voltage supply node Npres to which the reference voltage Vref is supplied, and a sampling switch SAM for controlling a connection between the reference voltage line RVL and the analog-to-digital converter ADC. The sensing reference switch SPRE is a switch for controlling characteristic value sensing driving, and the reference voltage Vref supplied to the reference voltage line RVL by the sensing reference switch SPRE becomes the sensing reference voltage VpreS.

The switch circuit for sensing the characteristic value of the driving transistor DRT may include a display reference switch RPRE for controlling display driving. The display reference switch RPRE may control a connection between the reference voltage line RVL and the display reference voltage supply node Nprer to which the reference voltage Vref is supplied. The display reference switch RPRE is a switch used to drive the display, and the reference voltage Vref supplied to the reference voltage line RVL by the display reference switch RPRE corresponds to the display reference voltage VpreR.

In this case, the sensing reference switch SPRE and the display reference switch RPRE may be separately provided or may be integrated into one. The sensing reference voltage VpreS and the display reference voltage VpreR may have the same voltage value or different voltage values.

The timing controller 140 of the display device 100 may include a memory MEM for storing the data transferred from the analog-to-digital converter ADC or previously storing a reference value and a compensation circuit COMP that compares the reference value stored in the memory MEM and the received data and compensates for the deviation in characteristic value. In this case, the compensation value calculated by the compensation circuit COMP may be stored in the memory MEM.

Accordingly, the timing controller 140 may update the image data DATA to be supplied to the data driving circuit 130 by using the compensation value calculated by the compensation circuit COMP and may output the compensation image data DATA_comp to the data driving circuit 130. Accordingly, the data driving circuit 130 may convert the compensation image data DATA_comp into an analog signal type of compensation data voltage Vdata_comp through a digital-to-analog converter DAC and output the compensation data voltage Vdata_comp to the data line DL through an output buffer BUF. As a result, the deviation in characteristic value (e.g., deviation in threshold voltage deviation or deviation in mobility) for the driving transistor DRT in the corresponding subpixel SP may be compensated.

As described above, the period for sensing the characteristic values (threshold voltage and mobility) of the driving transistor DRT may be performed after the power-on signal is generated and before the display driving starts. For example, if a power-on signal is applied to the display device 100, the timing controller 140 loads parameters necessary for driving the display panel 110 and then drives the display. In this case, the parameters necessary for driving the display panel 110 may include information about the sensing and compensation for characteristic values previously performed on the display panel 110. In the parameter loading process, the sensing of characteristic values (threshold voltage and mobility) of the driving transistor DRT may be performed. As described above, a process in which the characteristic value is sensed after the power-on signal is generated and before the subpixel emits light is referred to as an on-sensing process.

Alternatively, a period in which the characteristic value of the driving transistor DRT is sensed may proceed after a power-off signal of the display device 100 is generated. For example, when a power-off signal is generated in the display device 100, the timing controller 140 may cut off the data voltage supplied to the display panel 110 and may sense the characteristic value of the driving transistor DRT for a predetermined time. As such, a process in which sensing of the characteristic value is performed in a state in which the data voltage is cut off as a power-off signal is generated so that emission of the subpixel is terminated is referred to as an off-sensing process.

Further, the sensing period for the characteristic value of the driving transistor DRT may be performed in real time while the display is driven. This sensing process is referred to as a real-time (RT) sensing process. In the real-time sensing process, the sensing process may be performed on one or more subpixels SP in one or more subpixel SP lines, each blank period during the display driving period.

In other words, during the display driving period when an image is displayed on the display panel 110, a blank period in which the data voltage is not supplied to the subpixel SP exists within one frame or between the nth frame and the nth frame and, in the blank period, mobility sensing for one or more subpixels SP may be performed.

As such, when the sensing process is performed in the blank period, the subpixel (SP) line on which the sensing process is performed may be randomly selected. After the sensing process is performed during the blank period, the compensation data voltage Vdata_comp may be supplied to the subpixels SP where the sensing process has been performed during the display driving period. Accordingly, abnormalities in the subpixel SP line where the sensing process has been completed in the display driving period after the sensing process in the blank period may be further alleviated.

The data driving circuit 130 may include a data voltage output circuit 136 including a latch circuit, a digital-to-analog converter DAC, and an output buffer BUF and, in some cases, the data driving circuit 130 may further include an analog-to-digital converter ADC and various switches SAM, SPRE, and RPRE. Alternatively, the analog-to-digital converter ADC and various switches SAM, SPRE, and RPRE may be positioned outside the data driving circuit 130.

The compensation circuit COMP may be present inside or outside the timing controller 140. The memory MEM may be positioned outside the timing controller 140 or may be implemented, in the form of a register, inside the timing controller 140.

Figure 5:
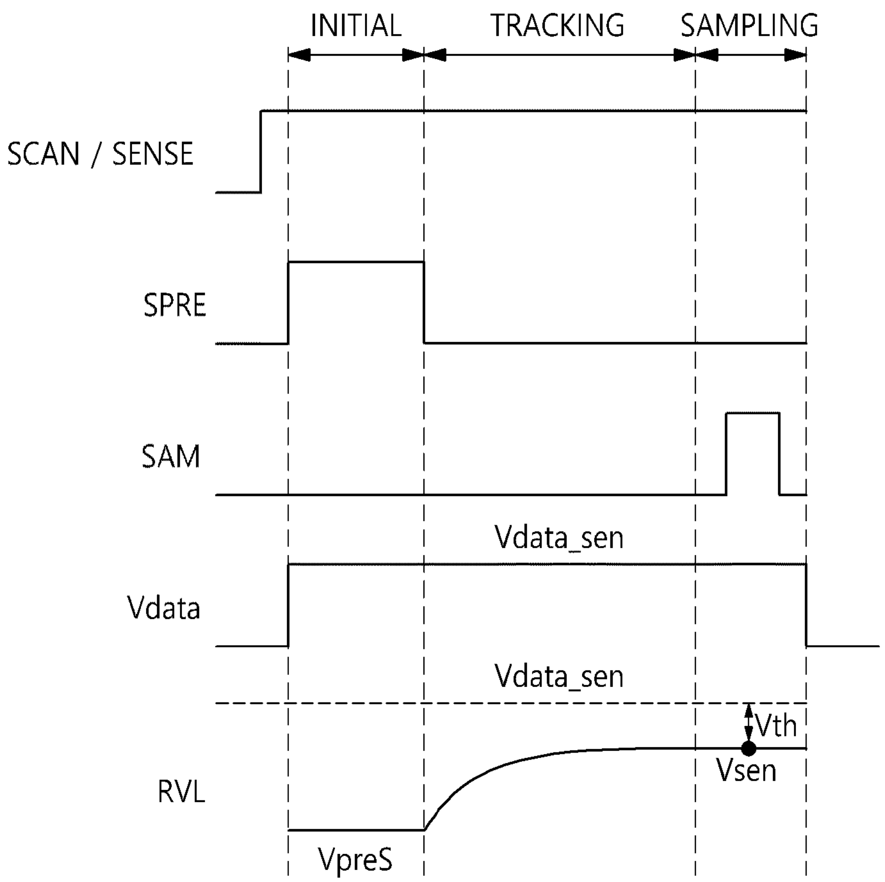
FIG. 5 is a driving timing diagram for sensing a threshold voltage of a driving transistor among characteristic values of a subpixel in a display device according to embodiments of the disclosure.

FIG. 5 is a driving timing diagram for sensing a threshold voltage of a driving transistor among characteristic values of a subpixel in a display device according to embodiments of the disclosure.

Referring to FIG. 5, in the display device 100 according to embodiments of the disclosure, the threshold voltage sensing period Vth SENSING may include an initialization period INITIAL, a tracking period TRACKING, and a sampling period SAMPLING.

In the initialization period INITIAL, the first switching transistor SWT is turned on by the scan signal SCAN of the turn-on level. Accordingly, the first node N1 of the driving transistor DRT is initialized to the sensing data voltage Vdata_sen for sensing the threshold voltage.

Further, in the initialization period INITIAL, the sensing transistor SENT is turned on and the sensing reference switch SPRE is turned on by the sense signal SENSE of the turn-on level voltage. Accordingly, the second node N2 of the driving transistor DRT is initialized to the sensing reference voltage VpreS.

The tracking period TRACKING is a step for tracking the threshold voltage Vth of the driving transistor DRT. In other words, in the tracking period TRACKING, the voltage of the second node N2 of the driving transistor DRT reflecting the threshold voltage Vth of the driving transistor DRT is tracked.

In the tracking period TRACKING, the switching transistor SWT and sensing transistor SENT remain turned on, and the sensing reference switch SPRE is turned off. Accordingly, the second node N2 of the driving transistor DRT may become a floating state, and the voltage of the second node N2 voltage of the driving transistor DRT starts to rise from the sensing reference voltage VpreS.

In this case, since the sensing transistor SENT is in a turned-on state, an increase in voltage of the second node N2 of the driving transistor DRT leads to an increase in voltage of the reference voltage line RVL.

The voltage of the second node N2 of the driving transistor DRT is increased and then saturated. The voltage saturated at the second node N2 of the driving transistor DRT corresponds to the difference (Vdata_sen-Vth) between the sensing data voltage Vdata_sen for the threshold voltage and the threshold voltage Vth of the driving transistor DRT.

Accordingly, when the voltage of the second node N2 of the driving transistor DRT is saturated, the voltage of the reference voltage line RVL corresponds to the difference Vdata_sen-Vth between the sensing data voltage Vdata_sen for the threshold voltage and the threshold voltage of the driving transistor DRT.

If the voltage of the second node N2 of the driving transistor DRT is saturated, the sampling switch SAM is turned on, and the sampling period SAMPLING proceeds.

In the sampling period SAMPLING, the analog-to-digital converter ADC may detect the sensing voltage Vsen of the reference voltage line RVL connected by the sampling switch SAM, and convert the sensing voltage Vsen into sensing data corresponding to a digital value. Here, the sensing voltage Vsen transferred by the analog-to-digital converter ADC corresponds to "Vdata_sen-Vth".

The compensation circuit COMP may identify the threshold voltage of the driving transistor DRT positioned in the corresponding subpixel SP based on sensing data output from the analog-to-digital converter ADC, and thus compensate for the threshold voltage of the driving transistor DRT.

In other words, the compensation circuit COMP may identify the threshold voltage Vth of the driving transistor DRT from the sensing data (digital data corresponding to Vdata_sen-Vth) measured through the threshold voltage sensing operation and the sensing data for the threshold voltage (digital data corresponding to Vdata_sen).

The compensation circuit COMP may compare the threshold voltage Vth identified for the corresponding driving transistor DRT with a reference threshold voltage or the threshold voltage of another driving transistor DRT to compensate for the threshold voltage deviation between the driving transistors DRT. Here, the deviation compensation of the threshold voltage may refer to a process of updating the data voltage Vdata to the compensation data voltage Vdata_comp, i.e., a process of multiplying the data voltage Vdata by a compensation gain G. (e.g., Vdata_comp=G*Vdata)

Accordingly, when the deviation of the threshold voltage increases, the compensation gain G multiplied by the data voltage Vdata may increase.

Figure 6:
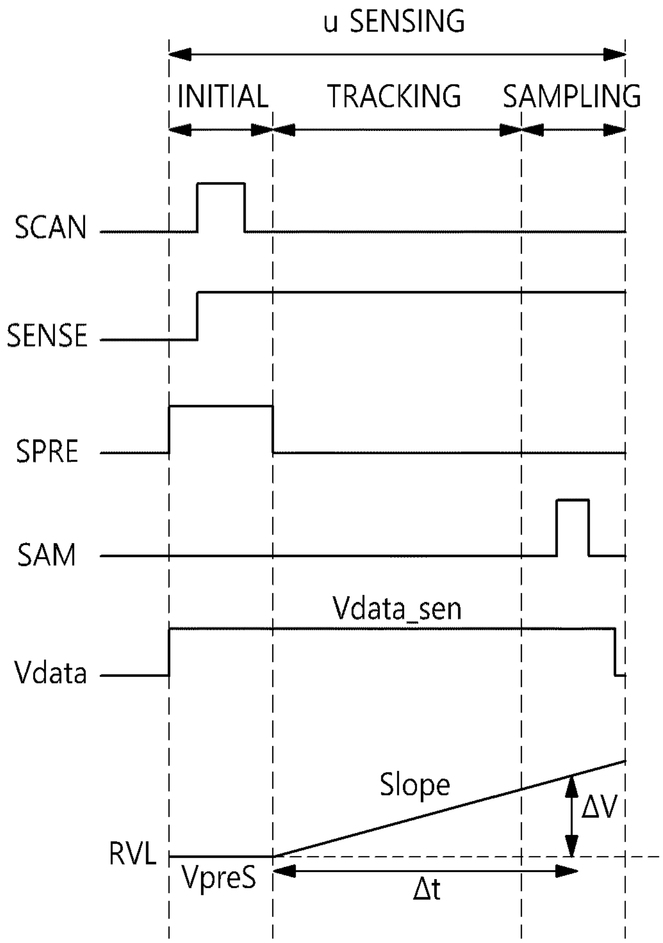
FIG. 6 is a driving timing diagram for sensing a mobility of a driving transistor among characteristic values of a subpixel in a display device according to embodiments of the disclosure.

FIG. 6 is a driving timing diagram for sensing a mobility of a driving transistor among characteristic values of a subpixel in a display device according to embodiments of the disclosure.

Referring to FIG. 6, in the display device 100 according to embodiments of the disclosure, a mobility sensing period u SENSING of a driving transistor DRT may include an initialization period INITIAL, a tracking period TRACKING, and a sampling period SAMPLING, like in the threshold voltage sensing operation.

Since the mobility of the driving transistor DRT is generally sensed by individually turning on or off the switching transistor SWT and the sensing transistor SENT, the sensing operation may be performed in a structure of individually applying the scan signal SCAN and the sense signal SENSE to the switching transistor SWT and the sensing transistor SENT, respectively, through the two gate lines GL.

In the initialization period INITIAL, the switching transistor SWT is turned on by the scan signal SCAN of the turn-on level, and the first node N1 of the driving transistor DRT is initialized to the sensing data voltage Vdata_sen for sensing mobility.

Further, by the sense signal SENSE of the turn-on level, the sensing transistor SENT is turned on, and the sensing reference switch SPRE is turned on. In this state, the second node N2 of the driving transistor DRT is initialized to the sensing reference voltage VpreS.

The tracking period TRACKING is a step of tracking the mobility of the driving transistor DRT. The mobility of the driving transistor DRT may indicate the current driving capability of the driving transistor DRT, which tracks the voltage of the second node N2 of the driving transistor DRT capable of calculating the mobility of the driving transistor DRT through the tracking period TRACKING.

In the tracking period TRACKING, the switching transistor SWT is turned off by the scan signal SCAN of the turn-off level, and the sensing reference switch SPRE transitions to the turn-off level. As a result, both the first node N1 and the second node N2 of the driving transistor DRT are floated, so that voltages of both the first node N1 and the second node N2 of the driving transistor DRT are increased. In particular, since the voltage of the second node N2 of the driving transistor DRT is initialized to the sensing reference voltage VpreS, the voltage starts to rise from the sensing reference voltage VpreS. In this case, since the sensing transistor SENT is in the turned-on state, the voltage increase of the second node N2 of the driving transistor DRT leads to the voltage increase of the reference voltage line RVL.

In the sampling period SAMPLING, the sampling switch SAM is turned on at a time after a predetermined time Δt elapses from a time at which the voltage of the second node N2 of the driving transistor DRT starts to rise. In this case, the analog-to-digital converter ADC may detect the sensing voltage Vsen of the reference voltage line RBL connected by the sampling switch SAM, and convert the sensing voltage Vsen into sensing data in the form of a digital signal. Here, the sensing voltage Vsen applied to the analog-to-digital converter ADC may correspond to a level VpreS+ΔV increased by a predetermined voltage ΔV from the sensing reference voltage VpreS.

The compensation circuit COMP may identify the mobility of the driving transistor DRT in the corresponding subpixel SP based on sensing data output from the analog-to-digital converter ADC, and may compensate for the deviation of the driving transistor DRT using the same. The compensation circuit COMP may identify the mobility of the driving transistor DRT from the sensing data VpreS+ΔV measured through the mobility sensing operation, the sensing reference voltage VpreS already known, and the elapsed time Δt.

In other words, the mobility of the driving transistor DRT is proportional to the voltage variation ΔV/Δt per unit time of the reference voltage line RBL in the tracking period TRACKING, i.e., the slope in the voltage waveform of the reference voltage line RBL. In this case, the compensation for the mobility deviation for the driving transistor DRT may refer to processing of changing the data voltage Vdata, i.e., operation processing of multiplying the data voltage Vdata by the compensation gain G. For example, the compensation data voltage Vdata_comp may be determined as a value Vdata_comp=G*Vdata obtained by multiplying the compensation gain G by the data voltage Vdata.

Meanwhile, in the case of the threshold voltage sensing operation of the driving transistor DRT, since it may take a long time for the voltage of the second node N2 of the driving transistor DRT to saturate, it may be performed as an off-sensing process that may be performed for somewhat a long time. On the other hand, since the mobility sensing operation of the driving transistor DRT may require a relatively short time compared to the threshold voltage sensing operation, it may be performed as an on-sensing process or a real-time sensing process that is performed for a short time.

Meanwhile, the display device 100 according to the disclosure may perform a characteristic value sensing operation on the driving transistor DRT, and then apply a recovery voltage within a blank period to reset the driving transistor DRT.

Figure 7:
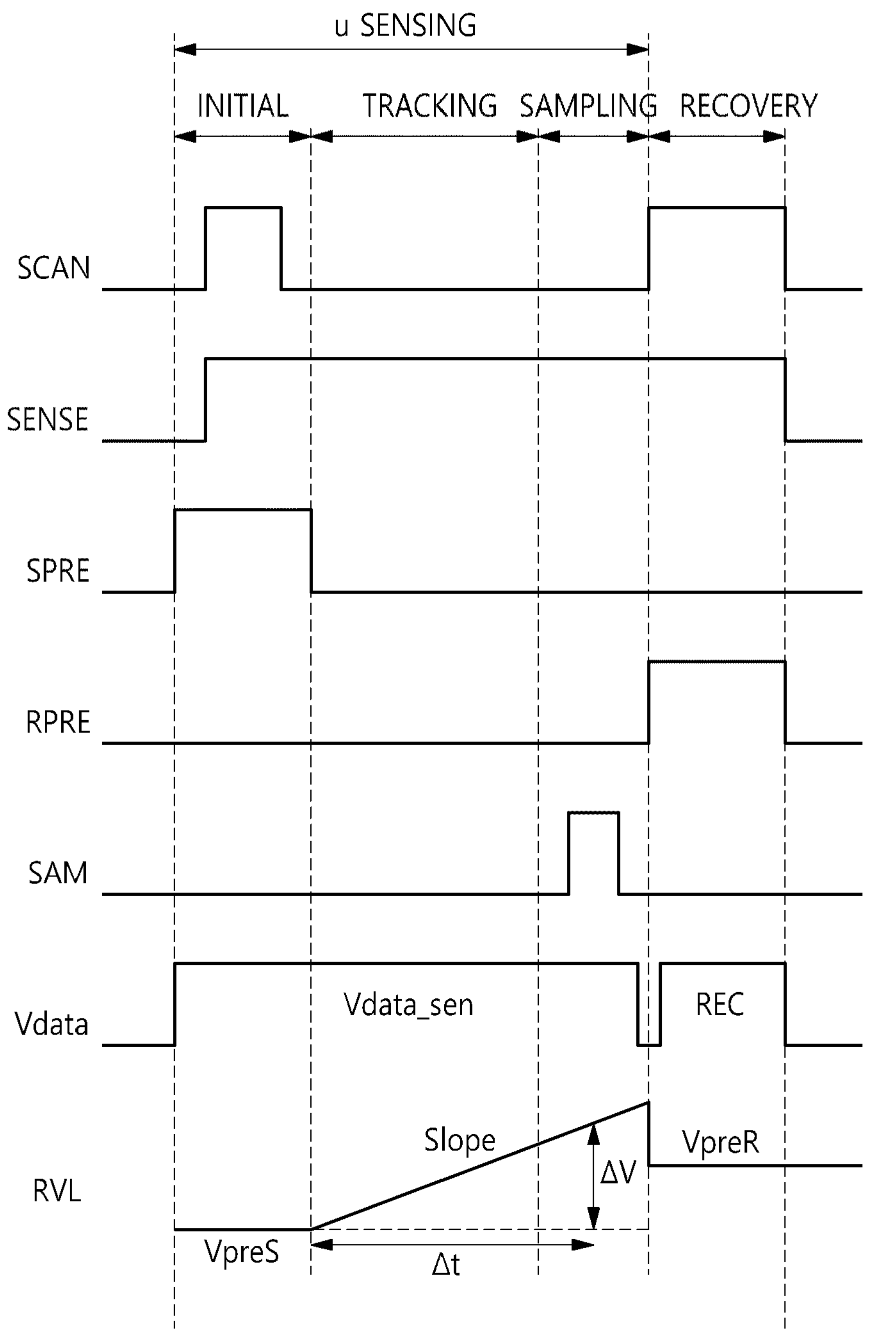
FIG. 7 is an example signal timing diagram when a recovery period is further included in a mobility sensing period of a driving transistor in a display device according to embodiments of the disclosure.

FIG. 7 is an example signal timing diagram when a recovery period is further included in a mobility sensing period of a driving transistor in a display device according to embodiments of the disclosure.

Referring to FIG. 7, in the display device 100 according to embodiments of the disclosure, a recovery period RECOVERY for resetting the driving transistor DRT may be further included in the mobility sensing period u SENSING.

Since the mobility of the driving transistor DRT is generally sensed by individually turning on or off the switching transistor SWT and the sensing transistor SENT, the sensing operation may be performed in a structure in which the scan signal SCAN and the sense signal SENSE are individually applied to the switching transistor SWT and the sensing transistor SENT through the two gate lines GL.

The initialization period INITIAL, the tracking period TRACKING, and the sampling period SAMPLING have been described above, and thus a description thereof is omitted below.

When sensing of the voltage of the second node N2 of the driving transistor DRT is performed through the sampling period SAMPLING, the recovery period RECOVERY may proceed. The recovery period RECOVERY may be performed during a predetermined period before starting display driving after sensing the mobility of the characteristic value of the driving transistor DRT. In other words, it may be regarded as a period for applying a recovery voltage REC to reset the applied voltage for display driving after the characteristic value sensing operation of the driving transistor DRT. The recovery voltage REC may be applied through the reference voltage line RBL in a state in which the display reference switch RPRE is turned on.

As described above, when the recovery voltage REC is applied to the driving transistor DRT in which the mobility sensing is performed, the luminance deviation with the driving transistor in which the mobility sensing is not performed may be reduced.

After the characteristic value sensing operation for the driving transistor DRT is performed on the selected subpixel line, a process of applying the recovery voltage REC within a blank period to reset the driving transistor DRT may be referred to as a first real-time sensing process.

Meanwhile, in the display device 100 according to the disclosure, if it is driven at a low frequency, the blank period increases, so that the light emission time increases, allowing it to be recognized as relatively increasing in luminance as compared with high-frequency driving. Accordingly, it may be recognized as a flicker due to an increase in the blank period. Thus, it is possible to reduce flicker due to an unintended increase in luminance caused by the increased blank period by applying the recovery voltage REC for resetting the driving transistor DRT in the recovery period and then applying the gray voltage on all the data lines DL of the display panel 110 in the blank period.

Figure 8:
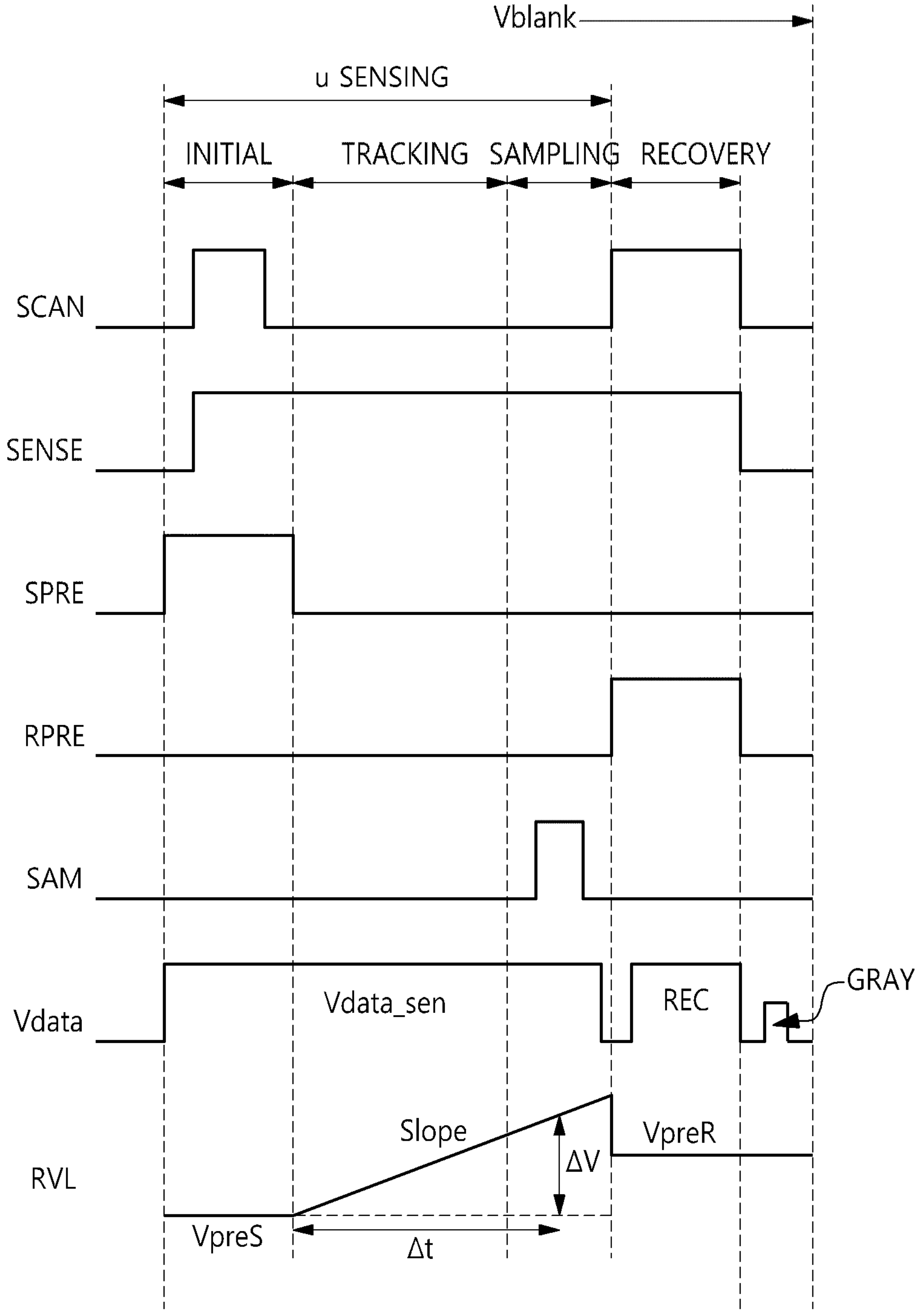
FIG. 8 is an example signal timing diagram when a recovery voltage and a gray voltage are applied in a recovery period after sensing a mobility of a driving transistor in a display device according to embodiments of the disclosure.

FIG. 8 is an example signal timing diagram when a recovery voltage and a gray voltage are applied in a recovery period after sensing a mobility of a driving transistor in a display device according to embodiments of the disclosure.

Referring to FIG. 8, the data driving circuit 130 of the display device 100 according to embodiments of the disclosure applies a recovery voltage REC for resetting the driving transistor DRT to the recovery period RECOVERY. Then, the gray voltage GRAY may be applied to all the data lines of the display panel 110 in a state in which the driving transistor DRT is turned off by blocking the scan signal SCAN and the sense signal SENSE within the blank period.

The initialization period INITIAL, the tracking period TRACKING, and the sampling period SAMPLING have been described above, and thus a description thereof is omitted below.

If sensing is performed on the voltage at the second node N2 of the driving transistor DRT for the selected line in the display panel 110 through the sampling period SAMPLING in the display device 100, the recovery period RECOVERY may proceed. The recovery period RECOVERY may be performed during a predetermined period before starting driving of the next frame after sensing the mobility for the driving transistor DRT of the selected line.

The recovery voltage REC may be applied to the selected line to reset the driving transistor DRT through the data line after the mobility sensing operation for the driving transistor DRT.

The recovery voltage REC may have the same level as the data voltage Vdata applied in the previous frame.

Then, within the blank period, the gray voltage GRAY may be applied to all the data lines of the display panel 110 in the blank period in a state in which the scan signal SCAN and the sense signal SENSE are blocked. As described above, in a state in which the scan signal SCAN and the sense signal SENSE are blocked, the gray voltage GRAY is applied to all the data lines of the display panel 110, and thus the voltages of the gate node and the source node of the driving transistor DRT may be lowered. As a result, the effect of an increase in luminance caused by an increase in the blank period may be offset.

The gray voltage GRAY may be lower in level than the recovery voltage REC. For example, the gray voltage GRAY may be a voltage corresponding to scale 2 of 0-255 grayscales.

As described above, by applying the recovery voltage REC in the mobility sensing period u SENSING and sequentially applying the gray voltage GRAY in the blank period, it is possible to reduce the luminance deviation from other lines that have not undergone mobility sensing and the luminance increase caused by the increase in the blank period.

The process of sequentially applying the recovery voltage REC for resetting the driving transistor DRT and the gray voltage GRAY to reduce the increase in luminance due to an increased blank period in the recovery period after performing the characteristic value sensing operation on the driving transistor DRT may be referred to as a second real-time sensing process.

The first real-time sensing process and the second real-time sensing process may be selectively performed according to the driving frequency. For example, when the display device operates at a driving frequency of 60 Hz or more, the first real-time sensing process may be performed in the blank period, and when the display device operates at a driving frequency of less than 60 Hz, the second real-time sensing process may be performed in the blank period.

The first real-time sensing process and the second real-time sensing process may be collectively referred to as a real-time sensing process.

When the real-time sensing process for the characteristic value is completed for all the lines of the display panel 110, the timing controller 140 may update the image data DATA to be supplied to the data driving circuit 130 using the compensation value calculated by the compensation circuit COMP, and output the compensation image data DATA_comp to the data driving circuit 130.

Figure 9:
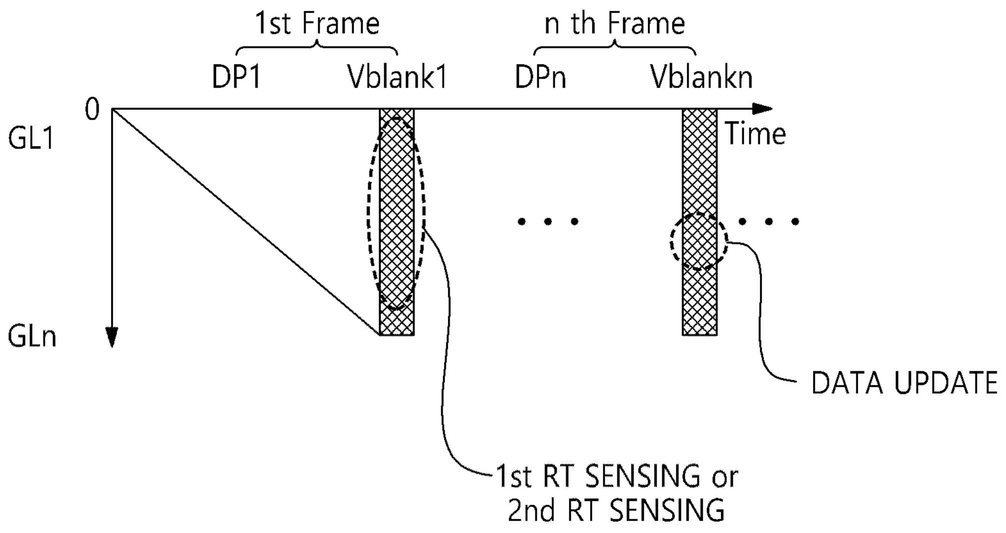
FIG. 9 is a view conceptually illustrating a real-time sensing process and data voltage update process in a display device according to embodiments of the disclosure.

FIG. 9 is a view conceptually illustrating a real-time sensing process and data voltage update process in a display device according to embodiments of the disclosure.

Referring to FIG. 9, the display device 100 according to embodiments of the disclosure may include display driving periods DP1, . . . , DPn in which the subpixel SP emits light and blank periods Vblank1, . . . , Vblankn in which the subpixel SP does not emit light in one frame.

The sensing process of sensing the characteristic value of the subpixel including the threshold voltage or mobility of the driving transistor DRT may be performed in the vertical blank periods Vblank1, . . . , Vblankn.

In this case, the sensing process for sensing the characteristic value of the subpixel may be the first real-time sensing process or the second real-time sensing process. In other words, the blank periods Vblank1, . . . , Vblankn may include a first real-time sensing period 1st RT SENSING in which a recovery voltage is applied after sensing the characteristic value, or may include a second real-time sensing period 2nd RT SENSING in which a recovery voltage REC for resetting the driving transistor DRT is applied after sensing the characteristic value, and a gray voltage GRAY for reducing an increase in luminance due to an increase in the blank period for all the data lines of the display panel 110 is applied.

Meanwhile, the data update process of updating the image data DATA to be supplied to the data driving circuit 130 using the compensation value may be performed after the characteristic value sensing of the subpixel is completed for a predetermined number of gate lines GL. For example, the data update period DATA UPDATE may be positioned in the nth blank period Vblankn after the characteristic value sensing is completed for all the n gate lines GL.

In this case, the characteristic value sensing of the subpixel is not performed in the data update period DATA UPDATE. Accordingly, the recovery voltage REC and the gray voltage GRAY may not be applied in the data update period DATA UPDATE.

Since the recovery voltage REC is a voltage for resetting the driving transistor DRT on which characteristic value sensing is performed, it does not need to be applied in the data update period DATA UPDATE, but because the gray voltage GRAY is a voltage for reducing a luminance deviation with the first line of the next frame, it should also be applied in the data update period DATA UPDATE.

The display device 100 according to the disclosure applies a gray voltage GRAY for reducing a luminance deviation with the first line of the next frame in the data update period DATA UPDATE. To that end, the display device 100 according to the disclosure may additionally generate the gray data enable signal for applying the gray voltage GRAY in the data update period DATA UPDATE in which the sensing data enable signal for sensing the characteristic value of the subpixel is not generated.

Figure 10:
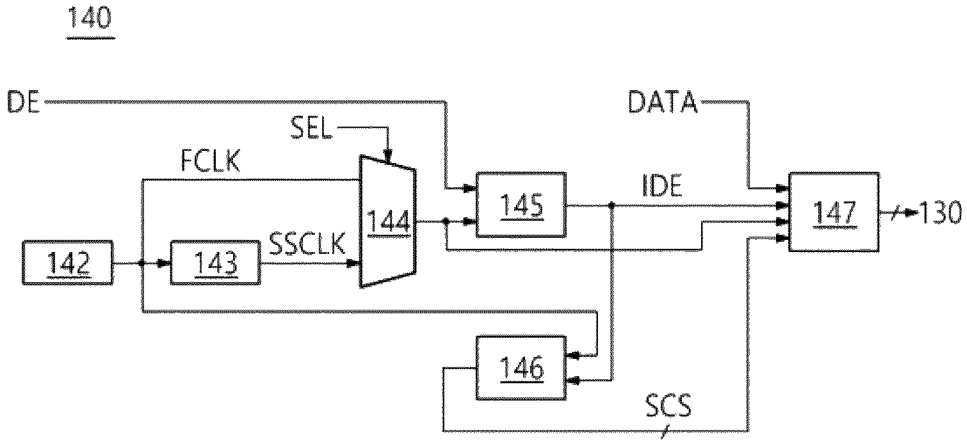
FIG. 10 is a block diagram illustrating an example of a sensing driving signal generation circuit according to embodiments of the disclosure.

FIG. 10 is a block diagram illustrating an example of a sensing driving signal generation circuit according to embodiments of the disclosure.

Referring to FIG. 10, the sensing driving signal generation circuit according to embodiments of the disclosure may be included in the timing controller 140.

The sensing driving signal generation circuit may include an oscillator 142, a spread clock generator 143, a multiplexer 144, an internal data enable signal generator 145, a switch control signal generator 146, and an output buffer 147.

The oscillator 142 generates a fixed clock FCLK having a constant frequency. The spread clock generator 143 generates the spread clock SSCLK by varying the frequency of the fixed clock FCLK.

The multiplexer 144 outputs the spread clock SSCLK in the display driving period DP in response to the selection signal SEL, and outputs the fixed clock FCLK in the vertical blank period Vblank. The timing controller 140 may count the data enable signal DE received from the host system and determine the display driving period DP and the vertical blank period Vblank for each frame period. The timing controller 140 controls the logical value of the selection signal SEL to differently control the output signal of the multiplexer 144 in the display driving period DP and the vertical blank period Vblank. The multiplexer 144 may output a fixed clock FCLK in a power-on sequence for supplying power to the display device 100 and a power-off sequence for cutting off power.

The internal data enable signal generator 145 counts the data enable signal DE based on the spread clock SSCLK received from the multiplexer 144, and modulates the period of the data enable signal DE in the display driving period DP. Accordingly, the period of the data enable signal DE is changed according to the frequency of the spread clock SSCLK.

The internal data enable signal generator 145 generates the internal data enable signal IDE by counting the data enable signal DE based on the fixed clock FCLK received from the multiplexer 144 in the vertical blank period. The internal data enable signal IDE output from the internal data enable signal generator 145 includes a sensing data enable signal SDE and a gray data enable signal GDE.

The gray data enable signal GDE may be generated using the data enable signal DE and the sensing data enable signal SDE.

The sensing data enable signal SDE and the gray data enable signal GDE may be generated at the same period.

The internal data enable signal generator 145 may count the fixed clock FCLK in the on-sensing process or the off-sensing process as well as the real-time sensing process to generate the sensing data enable signal SDE and the gray data enable signal GDE.

The switch control signal generator 146 counts the rising edge or the falling edge of the internal data enable signal IDE based on the fixed clock FCLK, and generates the switch control signal SCS when the count accumulated value reaches a preset count value. The switch control signal SCS is a signal for controlling the sampling switch SAM, the sensing reference switch SPRE, and the display reference switch RPRE.

The output buffer 147 receives the internal data enable signal IDE, the clock signals FCLK and SSCLK output from the multiplexer 144, the image data DATA, and the switch control signal SCS.

The output buffer 147 samples the image data DATA based on the data enable signal DE in the display driving period DP and transmits the same to the data driving circuit 130, and transmits the switch control signal SCS to the data driving circuit 130 in the vertical blank period Vblank.

Figure 11:
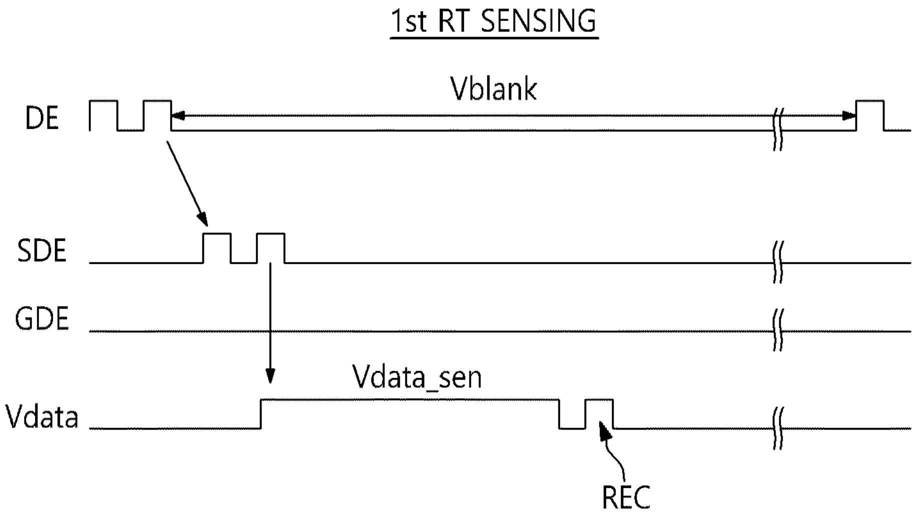
FIG. 11 is an example signal waveform diagram in a first real-time sensing period in a display driving method according to embodiments of the disclosure.
Figure 12:
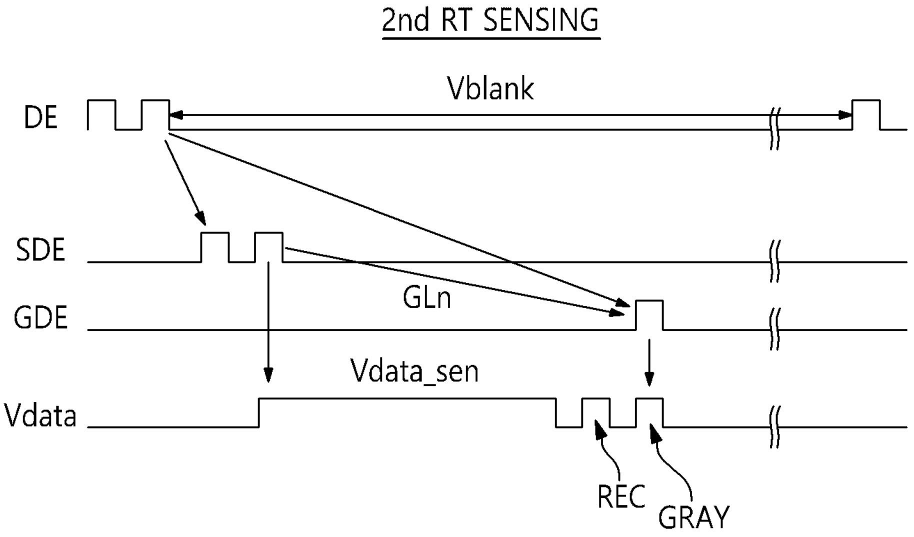
FIG. 12 is an example signal waveform diagram in a second real-time sensing period in a display driving method according to embodiments of the disclosure.
Figure 13:
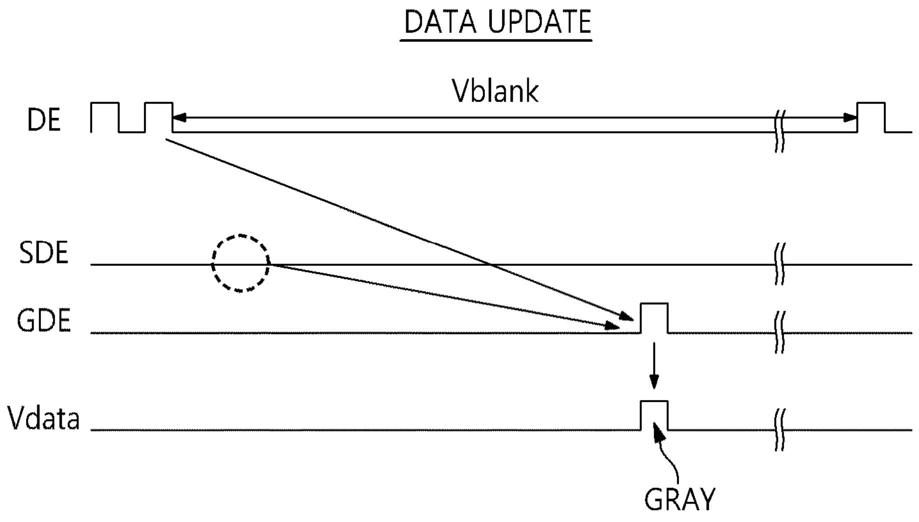
FIG. 13 is an example signal waveform diagram in a data update period in a display driving method according to embodiments of the disclosure.

FIG. 11 is an example signal waveform diagram in a first real-time sensing period in a display driving method according to embodiments of the disclosure. FIG. 12 is an example signal waveform diagram in a second real-time sensing period in a display driving method according to embodiments of the disclosure. FIG. 13 is an example signal waveform diagram in a data update period in a display driving method according to embodiments of the disclosure.

First, referring to FIG. 11, in the display driving method according to embodiments of the disclosure, the first real-time sensing process may be performed on one or more gate lines selected from the display panel 110 in which n gate lines are disposed.

When it is determined that the first real-time sensing period 1st RT SENSING is entered by counting the data enable signal DE, the timing controller 140 may generate the sensing data enable signal SDE. In this case, the gray data enable signal GDE maintains a low level.

According to the sensing data enable signal SDE, the sensing data voltage Vdata_sen for sensing the characteristic value of the subpixel for the selected line and the data voltage Vdata corresponding to the recovery voltage REC are transferred in the first real-time sensing period 1st RT SENSING.

In this case, because the gray data enable signal GDE maintains a low level in the first real-time sensing period 1st RT SENSING, the gray voltage GRAY is not included in the data voltage Vdata.

In other words, in the first real-time sensing period 1st RT SENSING, after sensing the characteristic value of the driving transistor DRT using the sensing data voltage Vdata_sen, only the recovery voltage REC for resetting the driving transistor DRT may be applied.

Referring to FIG. 12, in the display driving method according to embodiments of the disclosure, the second real-time sensing process may be performed on one or more gate lines selected from the display panel 110 in which n gate lines are disposed.

When it is determined that the second real-time sensing period 2nd RT SENSING is entered by counting the data enable signal DE, the timing controller 140 may generate the sensing data enable signal SDE and the gray data enable signal GDE.

According to the sensing data enable signal SDE and the gray data enable signal GDE, the sensing data voltage Vdata_sen for sensing the characteristic value of the subpixel for the selected line, the recovery voltage REC, and the data voltage Vdata corresponding to the gray voltage GRAY are transferred in the second real-time sensing period 2nd RT SENSING.

In other words, because the gray data enable signal GDE is also generated in the second real-time sensing period 2nd RT SENSING, after sensing the characteristic value of the driving transistor DRT using the sensing data voltage Vdata_sen, the recovery voltage REC for resetting the driving transistor DRT and the gray voltage GRAY for reducing the luminance increase due to the increase in the blank period may be sequentially applied.

In this case, since the recovery voltage REC is a voltage for resetting the driving transistor DRT, it is applied only to the subpixel in which characteristic value sensing is performed, but since the gray voltage GRAY is a low grayscale voltage for reducing a luminance increase that occurs as the blank period increases, it may be applied to all the data lines of the display panel 110 during the blank period.

Alternatively, in the second real-time sensing period 2nd RT SENSING, the sensing data voltage Vdata_sen for sensing the characteristic value of the subpixel, the recovery voltage REC, and the gray voltage GRAY may be sequentially generated using only the sensing data enable signal SDE without using the gray data enable signal GDE.

Referring to FIG. 13, in the display driving method according to embodiments of the disclosure, a data update process of generating a compensation data voltage may be performed when sensing of the characteristic value of the subpixel is completed for all the gate lines.

In the data update period DATA UPDATE in which the data update process proceeds, the characteristic value sensing process of the subpixel, i.e., the first real-time sensing process or the second real-time sensing process, does not proceed.

Accordingly, the timing controller 140 does not generate the sensing data enable signal SDE. However, the timing controller 140 may detect that the sensing data enable signal SDE has a low level in the vertical blank period Vblank, determine that the data update period DATA UPDATE is entered, and generate the gray data enable signal GDE.

According to the gray data enable signal GDE, the gray voltage GRAY for reducing the increase in luminance caused by the increase in the blank period during the data update period DATA UPDATE may be transferred through all the data lines of the display panel 110.

As such, after the sensing process for the characteristic value of the subpixel, the display device 100 according to the disclosure may independently control the gray voltage GRAY in the data update period DATA UPDATE for updating the data voltage, thereby enhancing the luminance deviation generated in the process of updating the data voltage.

Meanwhile, the display device 100 according to the disclosure may vary the driving frequency according to the type of the image data DATA or the driving mode. In this case, as the driving frequency of the display device 100 decreases, the visibility of the luminance deviation generated in the process of updating the data voltage may increase.

For example, the display device 100 according to the disclosure may operate in a default mode operating at one fixed frequency and a variable refresh rate (VRR) mode variable to a plurality of frequencies according to the type of image data DATA input from an external host system.

The image data DATA supplied to the display device 100 may be a still image or a moving image that varies at a constant speed, and the moving image may correspond to various types of images such as a sports image, a movie, or a game image.

Because the format of the image data DATA may vary according to the type thereof, the variable refresh rate mode in which the driving frequency varies according to the type of the image data may be used.

Figure 14:
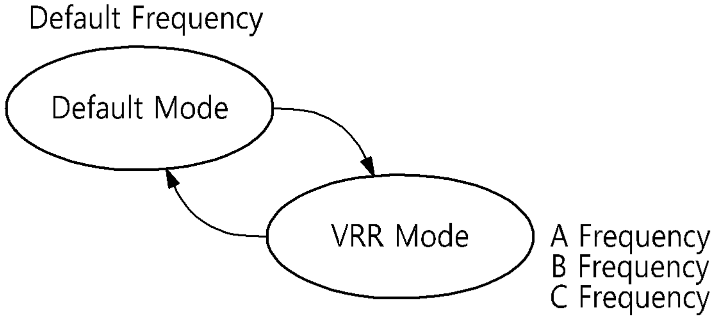
FIG. 14 is a view illustrating a concept of switching a default mode and a variable refresh rate mode depending on a type of image data in a display device according to embodiments of the disclosure.

FIG. 14 is a view illustrating a concept of switching a default mode and a variable refresh rate mode depending on a type of image data in a display device according to embodiments of the disclosure.

Referring to FIG. 14, the display device 100 according to embodiments of the disclosure may be divided into a default mode in which general image data such as a TV image is displayed at a fixed frequency, and a variable refresh rate mode (VRR mode) in which special image data such as a game image or a movie may be varied to a plurality of frequencies according to the selected function.

However, the image data operating in the default mode and the image data operating in the variable refresh rate mode may be variously changed, and the image data mentioned herein corresponds to some examples. Further, the operation mode divided according to whether the frequency of displaying the image data is variable may be expressed in various terms other than the default mode and the variable refresh rate mode.

For example, the TV image may operate in the default mode driven at the fixed driving frequency of 120 Hz, and the special image such as the game image or the movie may operate at the first frequency (e.g., frequency A), and then the operation may be changed to the second frequency (e.g., frequency B) or the third frequency (e.g., frequency C) according to the manipulation.

In short, the default mode and the variable refresh rate mode may be viewed as the first operation mode and the second operation mode, respectively, according to whether the driving frequency for displaying the image data DATA on the display panel 110 is fixed or variable.

When the external host system transmits the TV image to the display device 100, it may operate in the default mode of supplying the image data DATA through the fixed default frequency. When a special image such as game image or movie is supplied in a state in which image data DATA is supplied at the fixed default frequency in the default mode, the host system enters the variable refresh rate mode and supplies the image data DATA while changing the driving frequency among the first frequency (frequency A), the second frequency (frequency B), or the third frequency (frequency C) according to the selected first.

Conversely, when the TV image is supplied again while operating in the variable refresh rate mode, it is changed to the default mode to supply the image data DATA at the fixed default frequency.

As described above, the display device 100 according to the disclosure may be divided into the default mode operating at the fixed default frequency and the variable refresh rate mode variable to the plurality of frequencies according to the type of image data DATA supplied from the host system.

Meanwhile, in the process of changing from the default mode to the variable refresh rate mode or changing from the variable refresh rate mode to the default mode, the display device 100 according to the disclosure may supply image data of a specific luminance to the display panel 110 for a predetermined period of time to distinguish between the mode before change and the mode after change.

For example, when the default mode is changed to the variable refresh rate mode, image data of luminance A may be applied to the display panel 110 for a predetermined period of time. Alternatively, when the variable refresh rate mode is changed to the default mode, image data of luminance B may be applied to the display panel 110 for a predetermined period of time.

Accordingly, whether to change between the default mode and the variable refresh rate mode may be determined by detecting the luminance of the data voltage Vdata supplied from the data driving circuit 130 to the display panel 110 or by the luminance detected through the luminance detection camera or the like.

When the driving frequency is changed from the first frequency to the second frequency in the variable refresh rate mode, the range of the changed frequency may be determined by counting the number of data enable signals or horizontal synchronization signals.

In this case, when the display device 100 operates at a low speed driving frequency, the display driving period may include a refresh frame in which image data is output and an anode reset frame in which image data is not output.

Figure 15:
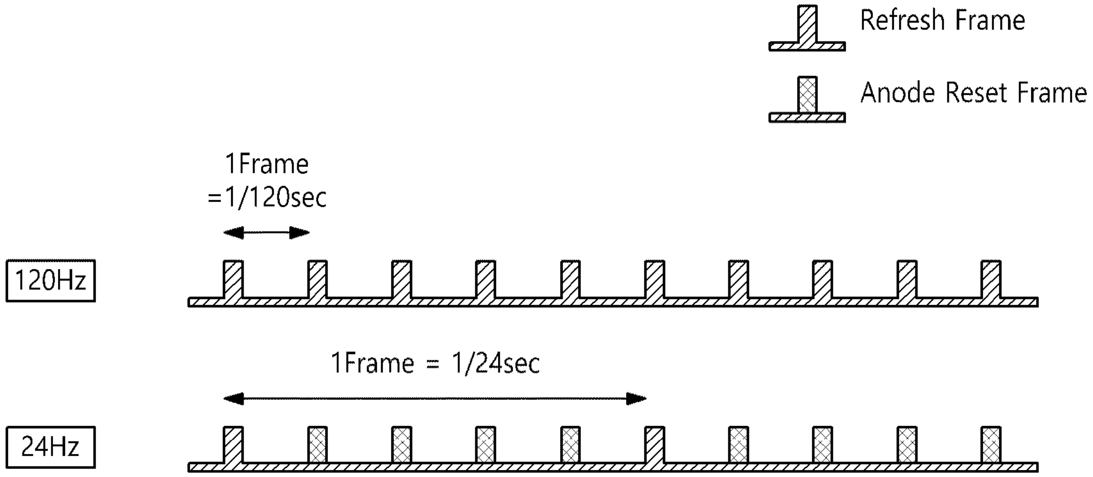
FIG. 15 is a view illustrating a structure of a refresh frame and an anode reset frame according to a driving frequency in a display device according to embodiments of the disclosure.

FIG. 15 is a view illustrating a structure of a refresh frame and an anode reset frame according to a driving frequency in a display device according to embodiments of the disclosure.

Referring to FIG. 15, the display device 100 according to embodiments of the disclosure may perform a high-speed driving operation in which all frames are refresh frames. Further, the display device 100 according to embodiments of the disclosure may perform a low-speed driving operation in which at least one anode reset frame exists between different refresh frames.

In the display device 100 of the disclosure, the driving frequency may be defined as the number of refresh frames output by the display device 100 for one second.

For example, the display device 100 may output 120 refresh frames for one second. In this case, the driving frequency of the corresponding display device 100 is defined as 120 Hz.

On the other hand, the display device 100 may output 24 refresh frames for one second. In this case, the driving frequency of the corresponding display device 100 is defined as 24 Hz.

When the display device 100 is driven at a driving frequency of 120 Hz in the normal driving mode, all of the 120 frames displayed in the display area for one second are refresh frames.

On the other hand, when the display device is driven at a driving frequency of 24 Hz in the low-speed driving mode, 24 of the 120 frames displayed for one second are refresh frames, and the remaining 96 frames are anode reset frames.

In other words, after one refresh frame is output, four anode reset frames may be continuously performed.

Accordingly, the display device 100 may change from the high-speed driving frequency to the low-speed driving frequency.

However, as the driving frequency of the display device 100 decreases, the time of the vertical blank period Vblank increases, so that the visibility of the luminance deviation that occurs in the process of updating the data voltage may increase.

Figure 16:
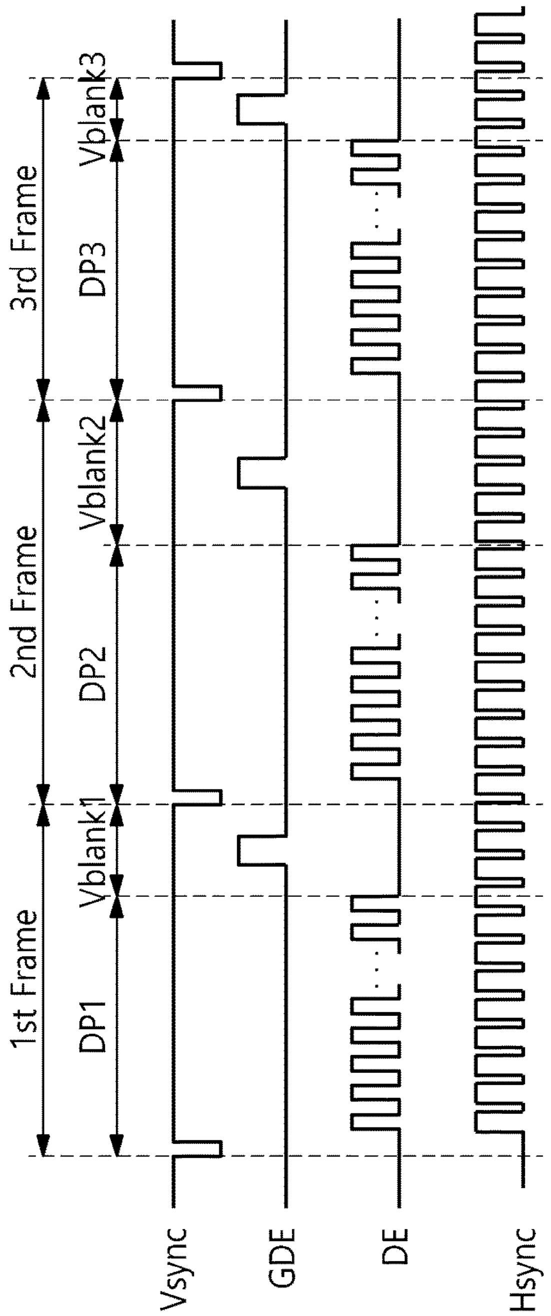
FIG. 16 is a view illustrating an example of a signal waveform in a variable refresh rate mode in which a vertical blank period is changed according to a driving frequency in a display device according to embodiments of the disclosure.

FIG. 16 is a view illustrating an example of a signal waveform in a variable refresh rate mode in which a vertical blank period is changed according to a driving frequency in a display device according to embodiments of the disclosure.

Here, the vertical synchronization signal Vsync, the gray data enable signal GDE, the horizontal synchronization signal Hsync, and the data enable signal DE supplied from the host system to the display device 100 are shown.

Here, one frame may indicate a time interval when an image is output once for the entire period of the display panel 110. Specifically, one frame includes a display driving period DP during which an image is output and a vertical blank period Vblank during which an image is not output. Further, a horizontal blank period may be included in the display driving period DP, and the horizontal blank period may be determined by the horizontal synchronization signal Hsync.

That the image is not output in the vertical blank period Vblank may mean that the data enable signal DE maintains a low level, so that the data voltage Vdata for implementing an image in the vertical blank period Vblank is not transferred to the data line DL. In other words, one frame may mean the concept of time.

The first frame 1st Frame, the second frame 2nd Frame, and the third frame 3rd Frame refer to an order of one-frame periods. In other words, the second frame 2nd Frame starts after the first frame 1st Frame, and the third frame 3rd Frame starts after the second frame 2nd Frame. Each of the first frame 1st Frame to the third frame 3rd Frame lasts for the one-frame period.

Here, the respective one-frame periods of the first frame 1st Frame to the third frame 3rd Frame may be different from each other. In particular, in the first frame 1st Frame to the third frame 3rd Frame, the display driving periods DP1, DP2, and DP3 may be the same, but the vertical blank periods Vblank1, Vblank2, and Vblank3 may be set to differ.

Referring to FIG. 16, in the display device 100 according to embodiments of the disclosure, the first display driving period DP1 of the first frame 1st Frame, the second display driving period DP2 of the second frame 2nd Frame, and the third display driving period DP3 of the third frame 3rd Frame are the same.

On the other hand, the first vertical blank period Vblank1 of the first frame 1st Frame, the second vertical blank period Vblank2 of the second frame 2nd Frame, and the third vertical blank period Vblank3 of the third frame 3rd Frame may be set to differ from each other.

One frame period may be determined as the period between the falling time of the vertical synchronization signal Vsync and the falling time of the next vertical synchronization signal Vsync, and the one frame period may be set to differ for each frame.

The display driving period DP may be constituted of a plurality of horizontal periods, and one horizontal period may include a high level period of the data enable signal DE when image data DATA is applied and a horizontal blank period (a low level period of the data enable signal DE) when image data DATA is not applied. Further, the display driving period DP includes a plurality of one horizontal periods to correspond to the number of gate lines GL constituting the display panel 110, and includes a display driving period DP and a vertical blank period Vblank, configuring one frame 1 Frame.

For example, when the default frequency set in the default mode is 120 Hz, the image data DATA of one frame may be repeatedly supplied 120 times for one second, and the one frame may have a time interval of 8.3 ms.

In this case, when the display panel 110 has a resolution of 2,160×3,840, 2,160 gate lines GL may be arranged in the vertical direction, and thus the data enable signal DE including 2,160 pulses may be applied in the display driving period DP to correspond to the time when the 2,160 gate lines GL are turned on in the one frame.

Meanwhile, during the display driving period DP, the data enable signal DE is applied in a pulse form, but during the vertical blank period Vblank, the data enable signal DE maintains a low level.

On the other hand, the horizontal synchronization signal Hsync may be applied in a pulse form not only in the display driving period DP but also in the vertical blank period Vblank. When the time interval of the vertical blank period Vblank changes according to the driving frequency in the variable refresh rate mode, the number of pulses of the horizontal synchronization signal Hsync included in one frame also changes. Accordingly, the driving frequency may be identified by detecting the number of pulses of the horizontal synchronization signal Hsync included in the first frame. For example, the driving frequency may be identified by detecting the number of pulses of the horizontal synchronization signal Hsync included between the falling time of the vertical synchronization signal Vsync and the next falling time.

In the variable refresh rate mode, as the driving frequency decreases, the time of the vertical blank period Vblank increases, and thus the visibility of the luminance deviation generated in the process of updating the data voltage may increase. In particular, when the gray voltage GRAY for reducing the luminance deviation with the first line of the next frame is controlled dependently on the sensing data enable signal SDE, an error of the gray voltage GRAY may occur in the data update period DATA UPDATE in which the sensing data enable signal SDE is not generated, and thus the luminance deviation may increase.

However, since the display device 100 according to the disclosure independently controls the gray voltage GRAY in the blank period Vblank by the gray data enable signal GDE, it may generate a normal gray voltage GRAY even in the data update period DATA UPDATE in which the sensing data enable signal SDE is not generated, thereby reducing the luminance deviation.

Figure 17:
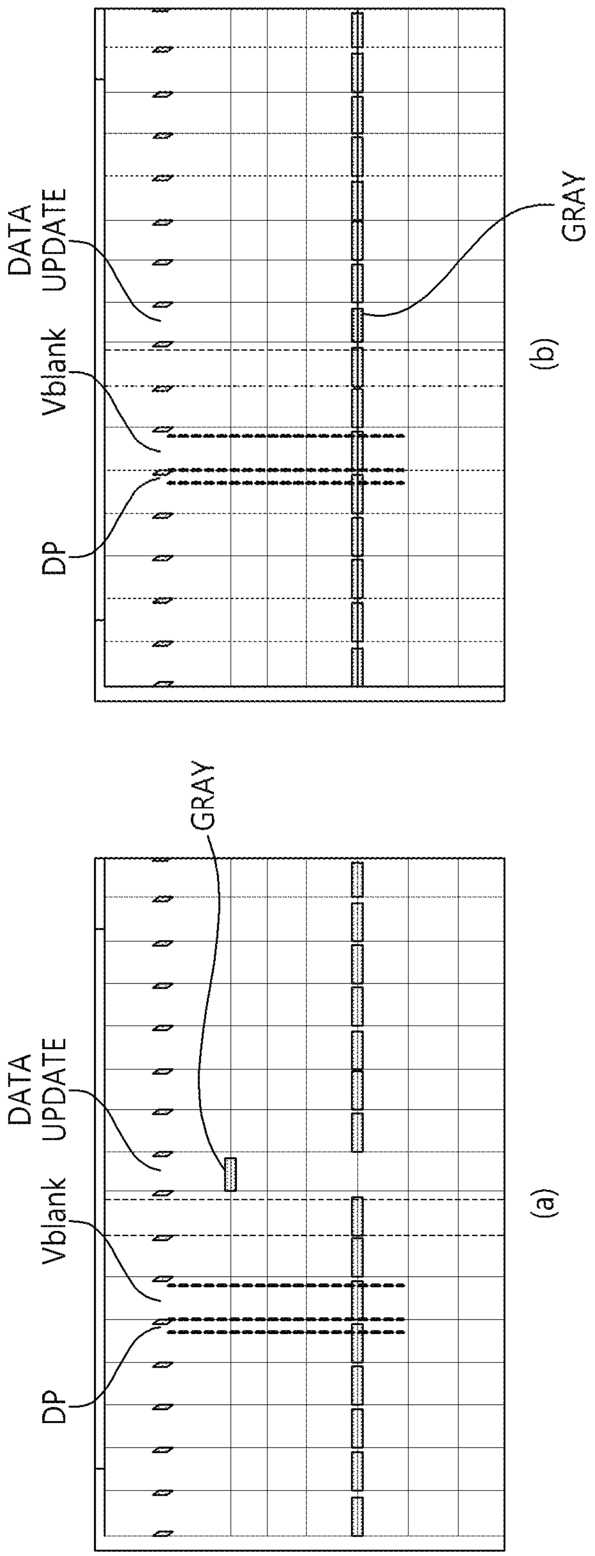
FIG. 17 is a view illustrating an example of a gray voltage applied in a data update period in a conventional display device and a display device according to the disclosure.

FIG. 17 is a view illustrating an example of a gray voltage applied in a data update period in a conventional display device and a display device according to the disclosure.

Referring to FIG. 17, when the gray voltage GRAY for reducing the luminance deviation with the first line of the next frame is controlled dependently on the sensing data enable signal SDE (case (a)), an error in the gray voltage GRAY may occur in the data update period DATA UPDATE in which the sensing data enable signal SDE is not generated.

This occurs when the recovery voltage REC and the gray voltage GRAY applied in the second real-time sensing period 2nd RT SENSING are generated based on the sensing data enable signal SDE. In other words, when the recovery voltage REC and the gray voltage GRAY are generated based on the sensing data enable signal SDE, the gray voltage GRAY is not applied or an error occurs in the data update period DATA UPDATE in which the sensing data enable signal SDE is not generated.

On the other hand, when a separate gray data enable signal GDE is generated and the gray voltage GRAY is independently controlled using the gray data enable signal GDE (case (b)), a normal gray voltage GRAY may be generated even in the data update period (DATA UPDATE) in which the sensing data enable signal SDE is not generated.

Accordingly, the display device 100 according to the disclosure may independently control the gray voltage GRAY in the data update period DATA UPDATE, thereby mitigating the luminance deviation generated in the process of updating the data voltage.

Embodiments of the disclosure described above are briefly described below.

A display device 100 according to the disclosure may comprise a display panel where a plurality of subpixels are disposed, a gate driving circuit applying a gate signal to the display panel, a data driving circuit converting image data into a data voltage and applying the data voltage to the display panel, and a timing controller controlling a sensing process for detecting a sensing voltage for a subpixel characteristic value in a blank period and a data update process for updating the image data according to the sensing voltage. The data driving circuit may apply a gray voltage for controlling a luminance deviation in the data update process to the display panel.

The timing controller may include an oscillator generating a fixed clock having a constant frequency, a spread clock generator generating a spread clock by varying the frequency of the fixed clock, a multiplexer outputting the spread clock in a display driving period and the fixed clock in the blank period in response to a selection signal, an internal data enable signal generator generating an internal data enable signal by counting a data enable signal based on the fixed clock received from the multiplexer in the blank period, a switch control signal generator generating a switch control signal by counting the internal data enable signal based on the fixed clock, and an output buffer sampling the image data based on the data enable signal in the display driving period and outputting the switch control signal in the blank period.

The internal data enable signal may include a sensing data enable signal controlling the sensing process, and a gray data enable signal controlling a time of applying the gray voltage.

The gray data enable signal may be generated using the data enable signal and the sensing data enable signal.

The sensing process may be a real-time sensing process performed in a vertical blank period in a middle of display driving.

The real-time sensing process may include a first real-time sensing process where, after a sensing voltage is detected for one or more selected gate lines, a recovery voltage for resetting an applied voltage is applied or a second real-time sensing process where, after the sensing voltage is detected for the one or more selected gate lines, the recovery voltage for resetting the applied voltage and the gray voltage are sequentially applied.

The first real-time sensing process and the second real-time sensing process may be selected according to a driving frequency.

The recovery voltage and the gray voltage may be generated using the sensing data enable signal.

The recovery voltage may be generated using the sensing data enable signal, and the gray voltage may be generated using the gray data enable signal.

The gray voltage may have a level lower than a level of the recovery voltage.

The gray voltage may be applied through all data lines of the display panel in a turned-off state of a driving transistor.

The blank period may have a time interval varying depending on a driving frequency.

A method for driving a display device including a display panel where a plurality of subpixels are disposed, a gate driving circuit applying a gate signal to the display panel, and a data driving circuit converting image data into a data voltage and applying the data voltage to the display panel, according to the disclosure, may comprise, in a blank period, a sensing process for detecting a sensing voltage for a subpixel characteristic value for one or more selected gate lines and a data update process for updating the image data according to a sensing voltage detected in the sensing process, wherein a gray voltage for controlling a luminance deviation is applied in the data update process.

The display driving method according to the disclosure may further comprise generating a fixed clock having a constant frequency, generating a spread clock by varying the frequency of the fixed clock, outputting the spread clock in a display driving period and the fixed clock in the blank period in response to a selection signal, generating an internal data enable signal by counting a data enable signal based on the fixed clock in the blank period, generating a switch control signal by counting the internal data enable signal based on the fixed clock, and sampling the image data based on the data enable signal in the display driving period and transmitting the switch control signal in the blank period.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
- a display panel including a plurality of subpixels;
- a gate driving circuit configured to apply a gate signal to the display panel;
- a data driving circuit configured to convert image data into a data voltage and apply the data voltage to the display panel; and
- a timing controller configured to control a sensing process for detecting a sensing voltage for a subpixel characteristic value in a blank period and to control a data update process for updating the image data according to the sensing voltage,
- wherein the data driving circuit is configured to apply a gray voltage through all data lines of the display panel in a turned-off state of a driving transistor for controlling a luminance deviation in the data update process to the display panel.

2. The display device of claim 1, wherein the timing controller includes:
- an oscillator configured to generate a fixed clock having a constant frequency;
- a spread clock generator configured to generate a spread clock by varying the frequency of the fixed clock;
- a multiplexer configured to output the spread clock in a display driving period and the fixed clock in the blank period in response to a selection signal;
- an internal data enable signal generator configured to generate an internal data enable signal by counting a data enable signal based on the fixed clock received from the multiplexer in the blank period;
- a switch control signal generator configured to generate a switch control signal by counting the internal data enable signal based on the fixed clock; and
- an output buffer configured to sample the image data based on the data enable signal in the display driving period and outputting the switch control signal in the blank period.

3. The display device of claim 2, wherein the internal data enable signal includes:
- a sensing data enable signal for controlling the sensing process; and
- a gray data enable signal for controlling a time of applying the gray voltage.

4. The display device of claim 3, wherein the gray data enable signal is generated based on the data enable signal and the sensing data enable signal.

5. The display device of claim 3, wherein the sensing process is a real-time sensing process performed in a vertical blank period in a middle of display driving.

6. The display device of claim 5, wherein the real-time sensing process includes:
- a first real-time sensing process where, after a sensing voltage is detected for one or more selected gate lines, a recovery voltage for resetting an applied voltage is applied; or
- a second real-time sensing process where, after the sensing voltage is detected for the one or more selected gate lines, the recovery voltage for resetting the applied voltage and the gray voltage are sequentially applied.

7. The display device of claim 6, wherein the first real-time sensing process and the second real-time sensing process are selected according to a driving frequency.

8. The display device of claim 7, wherein the recovery voltage and the gray voltage are generated using the sensing data enable signal.

9. The display device of claim 7, wherein the recovery voltage is generated using the sensing data enable signal, and wherein the gray voltage is generated using the gray data enable signal.

10. The display device of claim 7, wherein the gray voltage has a level lower than a level of the recovery voltage.

11. The display device of claim 1, wherein the blank period has a time interval configured to vary based on a driving frequency.

12. A method for driving a display device comprising a display panel including a plurality of subpixels, a gate driving circuit configured to apply a gate signal to the display panel, and a data driving circuit configured to convert image data into a data voltage and apply the data voltage to the display panel, the method comprising:

in a blank period, a sensing process for detecting a sensing voltage for a subpixel characteristic value for one or more selected gate lines; and a data update process for updating the image data according to a sensing voltage detected in the sensing process, wherein a gray voltage for controlling a luminance deviation is applied through all data lines of the display panel in a turned-off state of a driving transistor in the data update process.

13. The method of claim 12, wherein the sensing process includes a first sensing process where a recovery voltage for resetting an applied voltage is applied after the sensing voltage is detected.

14. The method of claim 12, wherein the sensing process includes a second sensing process where a recovery voltage for resetting an applied voltage and the gray voltage are sequentially applied after the sensing voltage is detected.

15. The method of claim 12, further comprising:

generating a fixed clock having a constant frequency;

generating a spread clock by varying the frequency of the fixed clock;

outputting the spread clock in a display driving period and the fixed clock in the blank period in response to a selection signal;

generating an internal data enable signal by counting a data enable signal based on the fixed clock in the blank period;

generating a switch control signal by counting the internal data enable signal based on the fixed clock; and sampling the image data based on the data enable signal in the display driving period and transmitting the switch control signal in the blank period.

16. The method of claim 15, wherein the internal data enable signal includes:

a sensing data enable signal controlling the sensing process; and a gray data enable signal controlling the gray voltage.

17. The method of claim 16, wherein the gray data enable signal is generated using the data enable signal and the sensing data enable signal.

* * * * *